(12) United States Patent
Lee et al.

(10) Patent No.: US 9,003,905 B1
(45) Date of Patent: Apr. 14, 2015

(54) POWER TRANSMITTING APPARATUS FOR VEHICLE

(71) Applicant: Hyundai Motor Company, Seoul (KR)

(72) Inventors: Sueng Ho Lee, Whasung-Si (KR);
Jongsool Park, Whasung-Si (KR);
Kyeonghun Lee, Whasung-Si (KR);
Choung Wan Son, Whasung-Si (KR);
Chang Yeon Cho, Whasung-Si (KP);
Jong Min Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/141,378

(22) Filed: Dec. 26, 2013

(30) Foreign Application Priority Data

Oct. 15, 2013 (KR) .......................... 10-2013-0122802

(51) Int. Cl.
*F16H 3/08* (2006.01)
*F16H 3/093* (2006.01)

(52) U.S. Cl.
CPC ...................................... *F16H 3/093* (2013.01)

(58) Field of Classification Search
USPC .................................... 74/330, 331, 333, 340
See application file for complete search history.

(56) References Cited

U.S. PATENT DOCUMENTS

| 3,589,483 | A | * | 6/1971 | Smith | 192/3.52 |
| 6,874,381 | B2 | * | 4/2005 | Berger et al. | 74/335 |
| 7,340,973 | B2 | * | 3/2008 | Hiraiwa | 74/330 |
| 7,383,749 | B2 |   | 6/2008 | Schafer et al. | |
| 2006/0266141 | A1 | * | 11/2006 | Ogami | 74/325 |
| 2007/0266810 | A1 | * | 11/2007 | Forsyth | 74/331 |
| 2008/0202266 | A1 | * | 8/2008 | Hendrickson et al. | 74/331 |

FOREIGN PATENT DOCUMENTS

| JP | 2010-164192 A | 7/2010 |
| JP | 2013-185613 A | 9/2013 |

* cited by examiner

*Primary Examiner* — Ha D Ho
(74) *Attorney, Agent, or Firm* — Morgan, Lewis & Bockius LLP

(57) ABSTRACT

A power transmitting apparatus may selectively transmit torque of power source to two input shafts through two clutches and may output changed torque through two output shafts after the torque selectively transmitted to the two input shafts is changed, wherein the two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

20 Claims, 13 Drawing Sheets

FIG. 3

| Speed | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | R1 | N |
| Rev1 | △ | | ○ | | | ● | | | ○ | | | ○ | | ● | |
| Rev2 | | △ | ● | | | ○ | | | ○ | | | ○ | | ● | |
| N | | | ○ | | | ○ | | | ○ | | | ○ | | | ○ |
| 1st | △ | | ● | | | ○ | | | ○ | | | ○ | | | ○ |
| 2nd | | △ | ○ | | | ● | | | ○ | | | ○ | | | ○ |
| 3rd | △ | | ○ | | | ○ | | | ● | | | ○ | | | ○ |
| 4th | | △ | ○ | | | | | ● | ○ | | | ○ | | | ○ |
| 5th | △ | | | | ● | ○ | | | ○ | | | ○ | | | ○ |
| 6th | | △ | ○ | | | ○ | | | ○ | | | ● | | | ○ |
| 7th | △ | | ○ | | | ○ | | | | | ● | | ○ | | ○ |

△ : clutch engage   ● : operating position   ○ : neutral position

FIG. 9

| Speed | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | R1 | N |
| Rev1 | △ | | | ○ | | ● | | | | ○ | | | ○ | ● | |
| Rev2 | | △ | | ○ | | | ○ | | ● | | | | ○ | ● | |
| N | | | | ○ | | | ○ | | | ○ | | | ○ | | ○ |
| 1st | △ | | ● | | | | ○ | | | ○ | | | ○ | | ○ |
| 2nd | | △ | | ○ | | ● | | | | ○ | | | ○ | | ○ |
| 3rd | △ | | | ○ | | | ○ | | ● | | | | ○ | | ○ |
| 4th | | △ | | ○ | | | | ● | | ○ | | | ○ | | ○ |
| 5th | △ | | | | ● | | ○ | | | ○ | | | ○ | | ○ |
| 6th | | △ | | ○ | | | ○ | | | ○ | | ● | | | ○ |
| 7th | △ | | | ○ | | | ○ | | | | ● | | ○ | | ○ |

△ : clutch engage  ● : operating position  ○ : neutral position

POWER TRANSMITTING APPARATUS FOR VEHICLE

CROSS-REFERENCE TO RELATED APPLICATION

The present application claims priority to Korean Patent Application No. 10-2013-0122802 filed on Oct. 15, 2013, the entire contents of which is incorporated herein for all purposes by this reference.

BACKGROUND OF THE INVENTION

1. Field of the Invention

The present invention relates to a power transmitting apparatus for a vehicle to which double clutches are applied. More particularly, the present invention relates to a power transmitting apparatus for a vehicle which minimizes a length thereof by disposing a synchronizer for reverse speeds on an additional idle shaft.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of minimizing a length of the power transmitting apparatus, an input shaft, and an output shaft and improving mountability by disposing a synchronizer and gears for reverse speeds on an additional reverse shaft, and reducing weight by minimizing the number of gears that is involved in the reverse speeds.

A power transmitting apparatus for a vehicle according to an exemplary embodiment of the present invention may selectively transmit torque of power source to two input shafts through two clutches and may output changed torque through two output shafts after the torque selectively transmitted to the two input shafts is changed.

The two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

One input gear on one input shaft of the two input shafts may be engaged with one of first and second reverse speed gears on a first reverse shaft disposed in parallel with the corresponding input shaft, the other of the first and second reverse speed gears on the first reverse shaft may be engaged with a third reverse speed gear fixed on a second reverse shaft disposed in parallel with the first reverse shaft, and the third reverse speed gear may be engaged with one input gear on the other input shaft.

One of the first and second reverse speed gears may be rotatable about the first reverse shaft and may be operably connected to the first reverse shaft through a synchronizer disposed on the first reverse shaft, and the other of the first and second reverse speed gears may be fixed on the first reverse shaft.

The two input shafts may include a first input shaft selectively receiving the torque of the power source through a first clutch, and a second input shaft being a hollow shaft in which the first input shaft is inserted without rotational interference with the second input shaft and receiving the torque of the power source through a second clutch, and the two output shafts may include first and second output shafts disposed in parallel with the first and second input shafts.

The first input shaft may be provided with first, second, third, and fourth input gears and the second input shaft may be provided with fifth and sixth input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, and a sixth speed gear engaged with the sixth input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

The first reverse speed gear may be engaged with the second input gear on the first input shaft, the second reverse speed gear may be engaged with the third reverse speed gear, and the third reverse speed gear may be engaged with the fifth input gear on the second input shaft.

The first reverse speed gear may be rotatable about the first reverse shaft and the second reverse speed gear may be fixed on first reverse shaft.

The first reverse speed gear may be fixed on the first reverse shaft and the second reverse speed gear may be rotatable about the first reverse shaft.

The first reverse speed gear may be engaged with the third reverse speed gear, the second reverse speed gear may be engaged with the fifth input gear on the second input shaft, and the third reverse speed gear may be engaged with the second input gear on the first input shaft.

The first reverse speed gear may be rotatable about the first reverse shaft and the second reverse speed gear may be fixed on the first reverse shaft.

The first reverse speed gear may be fixed on the first reverse shaft and the second reverse speed gear may be rotatable about the first reverse shaft.

The first input shaft may be provided with first, second, third, and fourth input gears and the second input shaft may be provided with fifth, sixth, and seventh input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, a sixth speed gear engaged with the sixth input gear, and an eighth speed gear engaged with the seventh input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear or the eighth speed gear to the second output shaft.

A power transmitting apparatus for a vehicle according to another exemplary embodiment of the present invention may selectively transmit torque of power source to two input shafts through two clutches and may output changed torque through two output shafts after the torque selectively transmitted to the two input shafts is changed.

The two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

One input gear on one input shaft of the two input shafts may be engaged with one of first and second reverse speed gears on a first reverse shaft disposed in parallel with the corresponding input shaft, the other of the first and second reverse speed gears on the first reverse shaft may be engaged with one of third and fourth reverse speed gears, and the other of the third and fourth reverse speed gears may be engaged with one input gear on the other input shaft.

One of the first and second reverse speed gears may be rotatable about the first reverse shaft and may be operably connected to the first reverse shaft through a synchronizer disposed on the first reverse shaft, and the other of the first and second reverse speed gears may be fixed on the first reverse shaft.

The two input shafts may include a first input shaft selectively receiving the torque of the power source through a first clutch, and a second input shaft being a hollow shaft in which the first input shaft is inserted without rotational interference with the second input shaft and receiving the torque of the power source through a second clutch, and the two output shafts may include first and second output shafts disposed in parallel with the first and second input shafts.

The first input shaft may be provided with first, second, third, and fourth input gears and the second input shaft may be provided with fifth and sixth input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, and a sixth speed gear engaged with the sixth input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

The first reverse speed gear may be engaged with the second input gear on the first input shaft, the second reverse speed gear may be engaged with the third reverse speed gear, and the third reverse speed gear may be engaged with the fifth input gear on the second input shaft.

The first reverse speed gear may be rotatable about the first reverse shaft and the second reverse speed gear may be fixed on first reverse shaft.

The first reverse speed gear may be fixed on the first reverse shaft and the second reverse speed gear may be rotatable about the first reverse shaft.

The first reverse speed gear may be engaged with the third reverse speed gear, the second reverse speed gear may be engaged with the fifth input gear on the second input shaft, and the third reverse speed gear may be engaged with the second input gear on the first input shaft.

The first reverse speed gear may be rotatable about the first reverse shaft and the second reverse speed gear may be fixed on the first reverse shaft.

The first reverse speed gear may be fixed on the first reverse shaft and the second reverse speed gear may be rotatable about the first reverse shaft.

The first input shaft may be provided with first, second, third, and fourth input gears and the second input shaft may be provided with fifth, sixth, and seventh input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, a sixth speed gear engaged with the sixth input gear, and an eighth speed gear engaged with the seventh input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear or the eighth speed gear to the second output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operational chart of a power transmitting apparatus for a vehicle according to the various exemplary embodiments of the present invention.

FIG. 9 is an operational chart of a power transmitting apparatus for a vehicle according to the various exemplary embodiments of the present invention.

Figure 1:
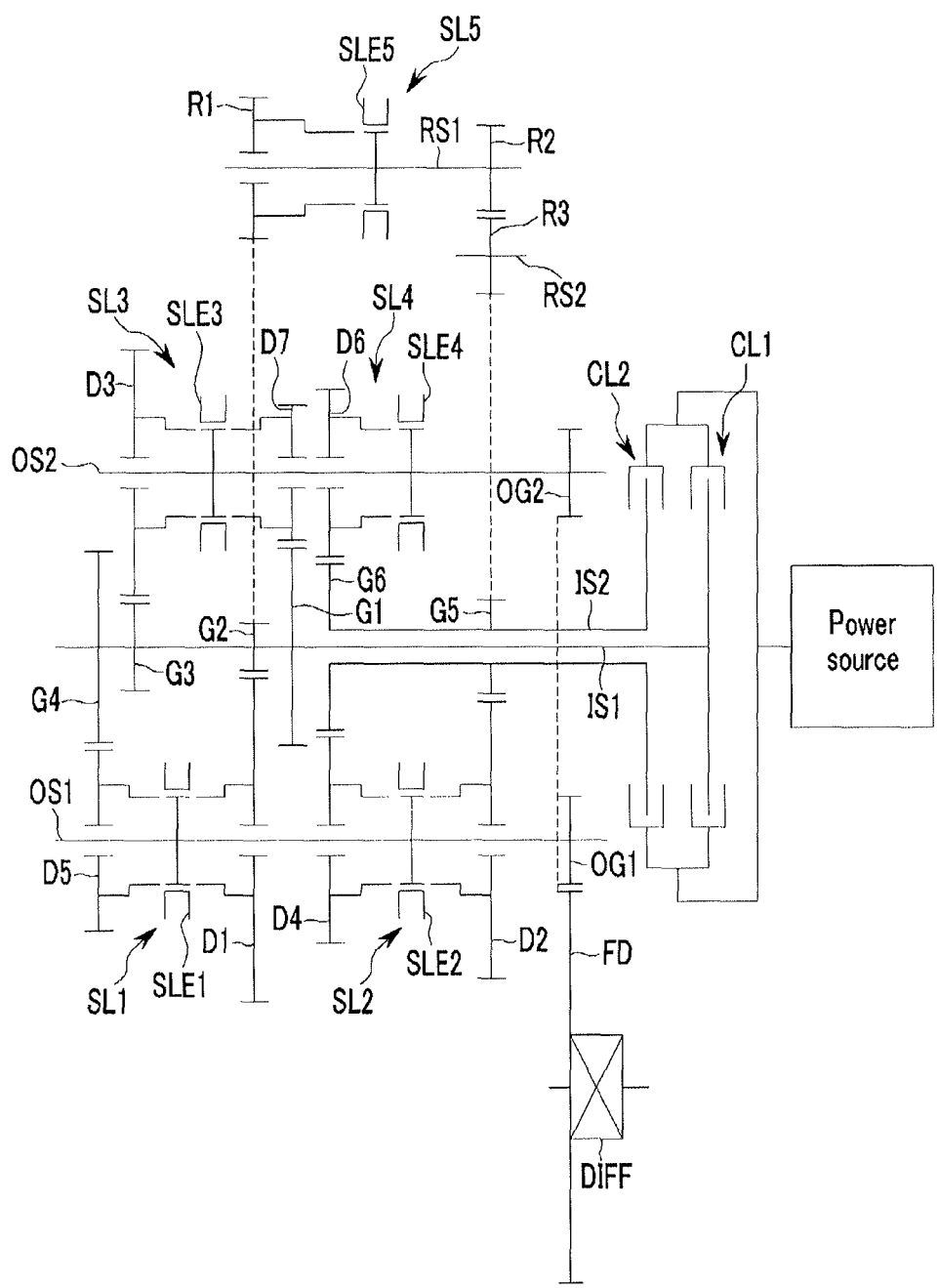
FIG. 1 is a schematic diagram of a power transmitting apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus for a vehicle according to the first exemplary embodiment of the present invention.

Referring to FIG. 1, a power transmitting apparatus according to the first exemplary embodiment of the present invention includes a variable connecting device provided with first and second clutches CL1 and CL2 and selectively transmitting torque of a power source (e.g., engine or motor), an input device provided with first and second input shafts IS1 and IS2, and a speed output device and a reverse speed device changing the torque received through the input device according to each shift-speed and outputting the changed torque.

The power source may be an engine in a vehicle provided with a manual transmission or an automatic transmission using a typical internal combustion engine and may be a motor in a hybrid electric vehicle including an electric vehicle driven by the motor.

The first and second clutches CL1 and CL2 included in the variable connecting device selectively transmits torque of the power source to the first and second input shafts IS1 and IS2.

The first clutch C1 selectively transmits the torque of the power source to the first input shaft IS1 and the second clutch CL2 selectively transmits the torque of the power source to the second input shaft IS2.

The first and second clutches CL1 and CL2 included in the variable connecting device may be typical multi-plates clutches of wet type, but are not limited thereto. The first and second clutches CL1 and CL2 may be multi-plates clutches of dry type. The first and second clutches CL1 and CL2 may be controlled by a hydraulic control system.

The input device includes the first input shaft IS1 selectively connected to an output side of the power source through the first clutch CL1 and the second input shaft IS2 selectively connected to the output side of the power source through the second clutch CL2. The second input shaft IS2 is a hollow shaft, and the first input shaft IS1 is inserted in the second input shaft IS2 without rotational interference with the second input shaft IS2.

First, second, third, and fourth input gears G1, G2, G3, and G4 are disposed at an exterior circumference of the first input shaft IS1 with predetermined distances. The first, second, third, and fourth input gear G1, G2, G3, and G4 are positioned at a rear portion of the first input shaft IS1 penetrating the second input shaft IS2 and are disposed in a sequence of the first, second, third, and fourth input gears G1, G2, G3, and G4.

Fifth and sixth input gears G5 and G6 are disposed on the second input shaft IS2 with a predetermined distance. The fifth input gear G5 is disposed at a front portion of the second input shaft IS2 and the sixth input gear G6 is disposed at a rear portion of the second input shaft IS2.

Therefore, the first, second, third, and fourth input gears G1, G2, G3, and G4 as well as the first input shaft IS1 are rotated if the first clutch CL1 is operated, and the fifth and sixth input gears G5 and G6 as well as the second input shaft IS2 are rotated if the second clutch CL2 is operated.

The first, second, third, fourth, fifth, and sixth input gears G1, G2, G3, G4, G5, and G6 are input gears operating at each speed. The first input gear G1 is operated at a seventh forward speed, the second input gear G2 is operated at a first forward speed and a reverse speed, the third input gear G3 is operated at a third forward speed, and the fourth input gear G4 is operated at a fifth forward speed.

In addition, the fifth input gear G5 is operated at a second forward speed and the sixth input gear G6 is operated at a fourth forward speed and a sixth forward speed.

That is, the input gears G1, G2, G3, and G4 for odd-numbered speeds and the reverse speed are disposed on the first input shaft IS1, and the input gears G5 and G6 for even-numbered speeds are disposed on the second input shaft IS2.

In addition, the speed output device includes first and second output shafts OS1 and OS2 disposed in parallel with the first and second input shafts IS1 and IS2.

A first speed gear D1 and a fifth speed gear D5 are disposed on the first output shaft OS1, and a first synchronizer SL1 operably connecting the first speed gear D1 or the fifth speed gear D5 to the first output shaft OS1 is disposed on the first output shaft OS1 between the first speed gear D1 and the fifth speed gear D5. In addition, a second speed gear D2 and a fourth speed gear D4 are disposed on the first output shaft OS1, and a second synchronizer SL2 operably connecting the second speed gear D2 or the fourth speed gear D4 to the first output shaft OS1 is disposed on the first output shaft OS1 between the second speed gear D2 and the fourth speed gear D4. Further, a first output gear OG1 is disposed at a front portion of the first output shaft OS1.

The first synchronizer SL1 is disposed at a rear portion of the first output shaft OS1 and the second synchronizer SL2 is disposed at the front portion of the first output shaft OS1.

The first speed gear D1 is engaged with the second input gear G2 and the fifth speed gear D5 is engaged with the fourth input gear G4.

The second speed gear D2 is engaged with the fifth input gear G5 and the fourth speed gear D4 is engaged with the sixth input gear G6.

In addition, the first output gear OG1 outputs torque transmitted from the first output shaft OS1 to a differential device DIFF through a final reduction gear FD.

In addition, a third speed gear D3 and a seventh speed gear D7 are disposed on the second output shaft OS2, and a third synchronizer SL3 operably connecting the third gear D3 or the seventh speed gear D7 to the second output shaft OS2 is disposed on the second output shaft OS2 between the third speed gear D3 and the seventh speed gear D7. In addition, a sixth speed gear D6 and a fourth synchronizer SL4 operably connecting the sixth speed gear D6 to the second output shaft OS2 are disposed on the second output shaft OS2. Further, a second output gear OG2 is disposed on a front portion of the second output shaft OS2.

The third synchronizer SL3 is disposed at a rear portion of the second output shaft OS2 and the fourth synchronizer SL4 is disposed at a front portion of the second output shaft OS2.

The third speed gear D3 is engaged with the third input gear G3 and the seventh speed gear D7 is engaged with the first input gear G1.

The sixth speed gear D6 is engaged with the sixth input gear G6.

In addition, the second output gear OG2 outputs torque transmitted from the second output shaft OS2 to the differential device DIFF through the final reduction gear FD.

Herein, the first output gear OG1 and the second output gear OG2 are engaged with the final reduction gear FD so as to finally change the torque of the first output shaft OS1 or the second output shaft OS2 and transmit the changed torque to a driving wheel through the differential device DIFF.

Meanwhile, the reverse speed device includes first and second reverse shafts RS1 and RS2 disposed in parallel with the first and second input shafts IS1 and IS2.

First and second reverse speed gears R1 and R2 are disposed on the first reverse shaft RS1. The first reverse speed gear R1 is rotatable about the first reverse shaft RS1 and the second reverse speed gear R2 is fixed to the first reverse shaft RS1.

In addition, a fifth synchronizer SL5 operably connecting the first reverse speed gear R1 to the first reverse shaft RS1 is disposed on the first reverse shaft RS1.

In addition, a third reverse speed gear R3 engaged with the second reverse speed gear R2 is fixed to the second reverse shaft RS2.

At this time, the first reverse speed gear R1 is engaged with the second input gear G2 on the first input shaft IS1, and the third reverse speed gear R3 is engaged with the fifth input gear G5 on the second input shaft IS2 engaged with the second speed gear D2 on the first output shaft OS1.

Since the first, second, third, fourth, and fifth synchronizer modules SL1, SL2, SL3, SL4, and SL5 are well known to a person of an ordinary skill in the art, detailed description thereof will be omitted. Sleeves SLE1, SLE2, SLE3, SLE4, and SLE5 applied respectively to the first, second, third, fourth, and fifth synchronizer modules SL1, SL2, SL3, SL4, and SL5, as well known to a person of an ordinary skill in the art, are operated by additional actuators and the actuators are controlled by a transmission control unit.

Figure 2:
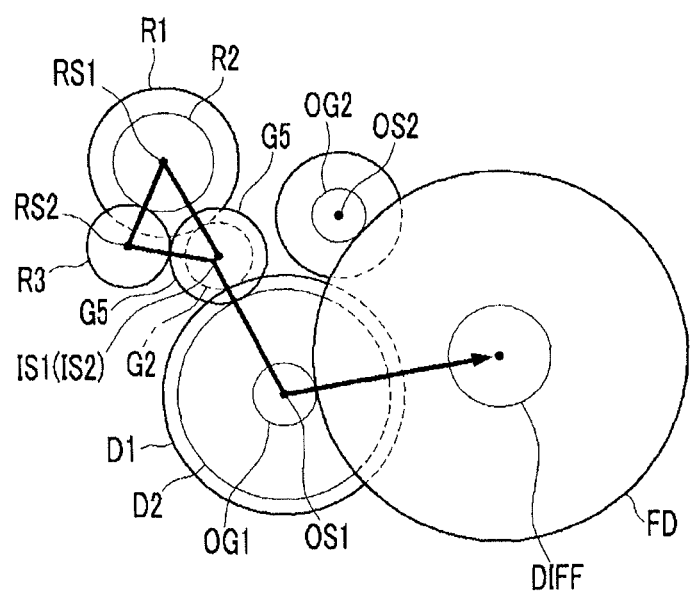
FIG. 2 is an axial plan view of a power transmitting apparatus for a vehicle according to the various exemplary embodiments of the present invention.

FIG. 2 is an axial plan view of a power transmitting apparatus for a vehicle according to the first exemplary embodiment of the present invention.

Referring to FIG. 2, the first input shaft IS1 as well as the second input shaft IS2, the first and second output shafts OS1 and OS2, the first and second reverse shafts RS1 and RS2, and the differential device DIFF are disposed in parallel with each other.

The second input gear G2 on the first input shaft IS1 is engaged with the first speed gear D1 on the first output shaft OS1 and the first reverse speed gear R1 on the first reverse shaft RS1, and the second reverse speed gear R2 on the first reverse shaft RS1 is engaged with the third reverse speed gear R3 on the second reverse shaft RS2.

In addition, the third reverse speed gear R3 on the second reverse shaft RS2 is engaged with the fifth input gear G5 on the second input shaft IS2, and the fifth input gear G5 on the second input shaft IS2 is engaged with the second speed gear D2 on the first output shaft OS1.

In addition, first and second output gears OG1 and OG2 on the first and second output shafts OS1 and OS2 are engaged with the final reduction gear FD of the differential device DIFF.

FIG. 3 is an operational chart of a power transmitting apparatus for a vehicle according to the first exemplary embodiment of the present invention.

[First Forward Speed]

At the first forward speed 1st, the first speed gear D1 and the first output shaft OS1 are operably connected through the sleeve SEL1 of the first synchronizer SL1. After that, the first clutch CL1 is operated. Then, shift to the first forward speed is completed.

[Second Forward Speed]

If vehicle speed increases at the first forward speed 1st and shift to the second forward speed 2nd is necessary, the second speed gear D2 and the first output shaft OS1 are operably connected through the sleeve SEL2 of the second synchronizer SL2. After that, the first clutch CL1 is released and the second clutch CL2 is operated. Then, the shift to the second forward speed is completed.

After the shift to the second forward speed is completed, the sleeve SEL1 of the first synchronizer SL1 is moved to a neutral position.

[Third Forward Speed]

If the vehicle speed increases at the second forward speed 2nd and shift to the third forward speed 3rd is necessary, the third speed gear D3 and the second output shaft OS2 are operably connected through the sleeve SEL3 of the third synchronizer SL3. After that, the second clutch CL2 is released and the first clutch CL1 is operated. Then, the shift to the third forward speed is completed.

After the shift to the third forward speed is completed, the sleeve SEL2 of the second synchronizer SL2 is moved to a neutral position.

[Fourth Forward Speed]

If the vehicle speed increases at the third forward speed 3rd and shift to the fourth forward speed 4th is necessary, the fourth speed gear D4 and the first output shaft OS1 are operably connected through the sleeve SEL2 of the second synchronizer SL2. After that, the first clutch CL1 is released and the second clutch CL2 is operated. Then, the shift to the fourth forward speed is completed.

After the shift to the fourth forward speed is completed, the sleeve SEL3 of the third synchronizer SL3 is moved to a neutral position.

[Fifth Forward Speed]

If the vehicle speed increases at the fourth forward speed 4th and shift to the fifth forward speed 5th is necessary, the fifth speed gear D5 and the first output shaft OS1 are operably connected through the sleeve SEL1 of the first synchronizer SL1. After that, the second clutch CL2 is released and the first clutch CL1 is operated. Then, the shift to the fifth forward speed is completed.

After the shift to the fifth forward speed is completed, the sleeve SEL2 of the second synchronizer SL2 is moved to a neutral position.

[Sixth Forward Speed]

If the vehicle speed increases at the fifth forward speed 5th and shift to the sixth forward speed 6th is necessary, the sixth speed gear D6 and the second output shaft OS2 are operably connected through the sleeve SEL4 of the fourth synchronizer SL4. After that, the first clutch CL1 is released and the second clutch CL2 is operated. Then, the shift to the sixth forward speed is completed.

After the shift to the sixth forward speed is completed, the sleeve SEL1 of the first synchronizer SL1 is moved to a neutral position.

[Seventh Forward Speed]

If the vehicle speed increases at the sixth forward speed 6th and shift to the seventh forward speed 7th is necessary, the seventh speed gear D7 and the second output shaft OS2 are operably connected through the sleeve SEL3 of the third synchronizer SL3. After that, the second clutch CL2 is released and the first clutch CL1 is operated. Then, the shift to the seventh forward speed is completed.

After the shift to the seventh forward speed is completed, the sleeve SEL4 of the fourth synchronizer SL4 is moved to a neutral position.

Figure 4:
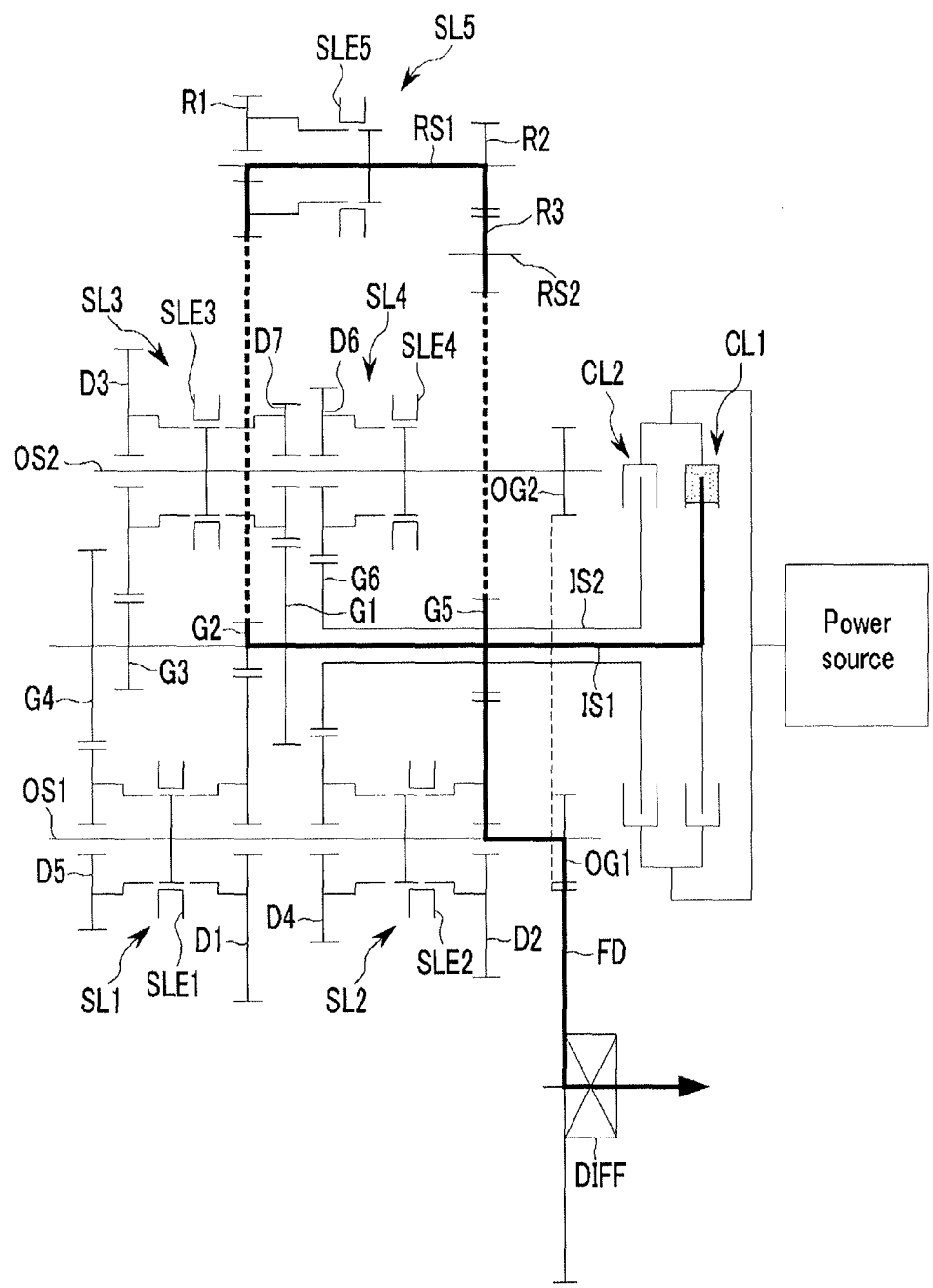
FIG. 4 is a drawing for illustrating flow of power at a first reverse speed in a power transmitting apparatus for a vehicle according to the various exemplary embodiments of the present invention.
Figure 5:
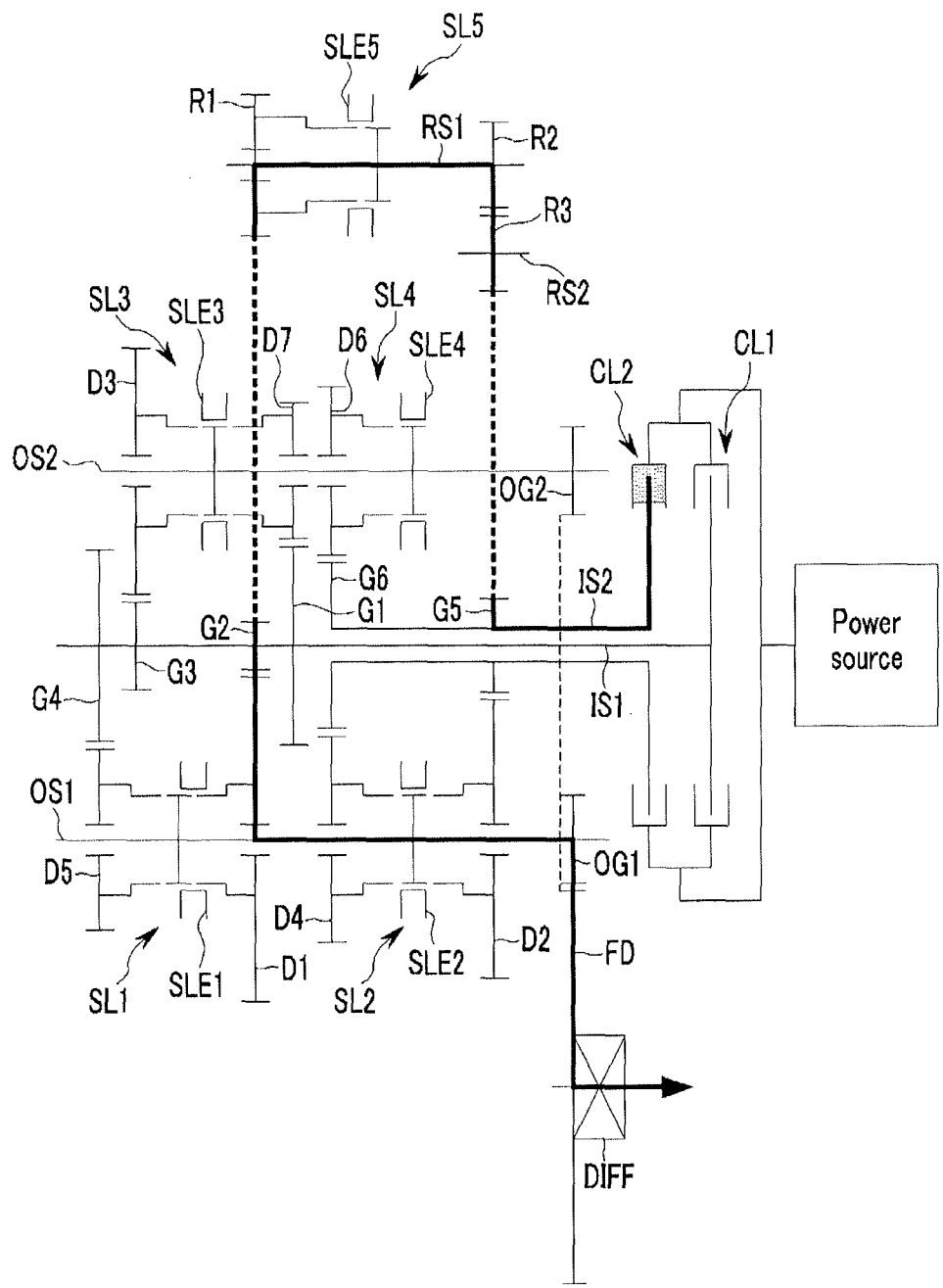
FIG. 5 is a drawing for illustrating flow of power at a second reverse speed in a power transmitting apparatus for a vehicle according to the various exemplary embodiments of the present invention.

FIG. 4 is a drawing for illustrating flow of power at a first reverse speed in a power transmitting apparatus for a vehicle according to the first exemplary embodiment of the present invention, and FIG. 5 is a drawing for illustrating flow of power at a second reverse speed in a power transmitting apparatus for a vehicle according to the first exemplary embodiment of the present invention.

Referring to FIG. 3 and FIG. 4, the second speed gear D2 and the first output shaft OS1 are operably connected through the sleeve SEL2 of the second synchronizer SL2 and the first reverse speed gear R1 and the first reverse shaft RS1 are operably connected through the sleeve SEL5 of the fifth synchronizer SL5 at a first reverse speed Rev1. After that, if the first clutch CL1 is operated, a shift to the first reverse speed is completed.

Therefore, the torque of the power source is transmitted to the final reduction gear FD through the first input shaft IS1, the second input gear G2, the first reverse speed gear R1, the first reverse shaft RS1, the second reverse speed gear R2, the third reverse speed gear R3, the fifth input gear G5, the second speed gear D2, the first output shaft OS1, and the first output gear OG1. Therefore, the driving wheel is rotated inversely.

Referring to FIG. 3 and FIG. 5, the first speed gear D1 and the first output shaft OS1 are operably connected through the sleeve SEL1 of the first synchronizer SL1 and the first reverse speed gear R1 and the first reverse shaft RS1 are operably connected through the sleeve SEL5 of the fifth synchronizer SL5 at a second reverse speed Rev2. After that, if the second clutch CL2 is operated, a shift to the second reverse speed is completed.

Therefore, the torque of the power source is transmitted to the final reduction gear FD through the second input shaft IS2, the fifth input gear G5, the third reverse speed gear R3, the second reverse speed gear R2, the first reverse shaft RS1, the first reverse speed gear R1, the second input gear G2, the first speed gear D1, the first output shaft OS1, and the first output gear OG1. Therefore, the driving wheel is rotated inversely.

The power transmitting apparatus for the vehicle according to the first exemplary embodiment of the present invention can achieve two reverse speeds by control of the first and second clutches CL1 and CL2 and the synchronizers.

Two synchronizers SL1 and SL2, the first speed gear D1, the fifth speed gear D5, the second speed gear D2, the fourth speed gear D4 and the first output gear OG1 are disposed on the first output shaft OS1, two synchronizers SL3 and SL4, the third speed gear D3, the seventh speed gear D7, the sixth speed gear D6 and the second output gear OG2 are disposed on the second output shaft OS2, and one synchronizer SL5 and the first, second, and third reverse speed gears R1, R2, and R3 involved in the reverse speeds are disposed on the first and second reverse shafts RS1 and RS2 in the power transmitting apparatus according to the first exemplary embodiment of the present invention.

Since the fourth synchronizer SL4 operably connects one speed gear to the second output shaft OS2, the number of components may be reduced and a length may be shortened.

Weight and cost may be reduced due to reduction of the number of components, and mountability may be improved by shortening length of the transmission.

Figure 6:
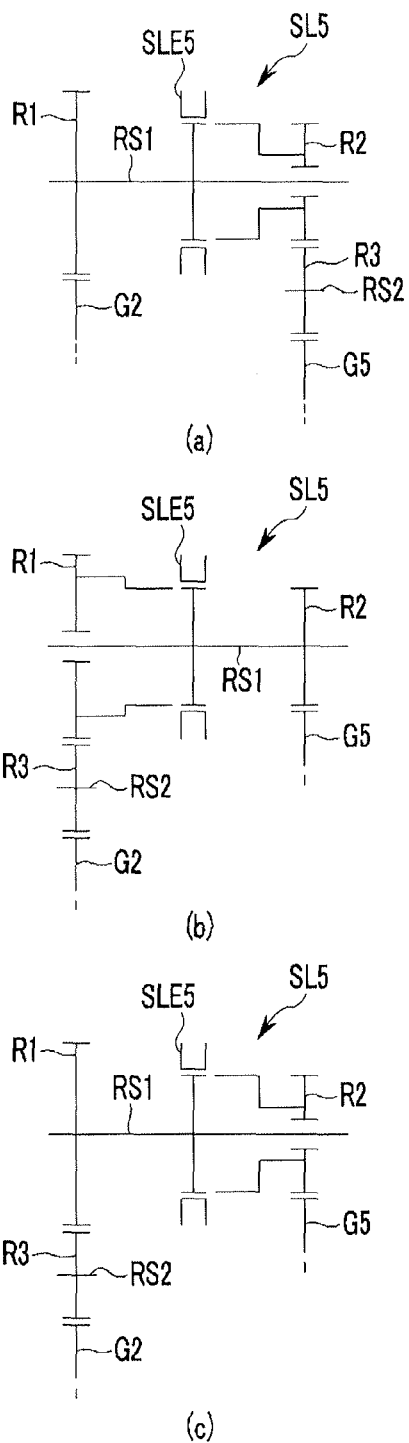
FIG. 6 is a drawing of another example of a reverse speed device in a power transmitting apparatus for a vehicle according to the various exemplary embodiments of the present invention.

FIG. 6 is a drawing of another example of a reverse speed device in a power transmitting apparatus for a vehicle according to the first exemplary embodiment of the present invention.

Referring to FIG. 6, the reverse speed device having various layouts can be achieved by disposing the fifth synchronizer SL5 and the third reverse speed gear R3 in different ways in the power transmitting apparatus for the vehicle according to the first exemplary embodiment of the present invention.

That is, since structure and function of the variable connecting device, the input device and the speed output device are not changed although the layout of the reverse speed device is changed, only the reverse speed device will be described in detail.

Referring to FIG. 6A, the first reverse speed gear R1 is fixed to the first reverse shaft RS1, the second reverse speed gear R2 is rotatable about the first reverse shaft RS1, and the fifth synchronizer SL5 is disposed on the first reverse shaft RS1 and operably connects the second reverse speed gear R2 with the first reverse shaft RS1.

Referring to FIG. 6B, the third reverse speed gear R3 fixed to the second reverse shaft RS2 is engaged with the first reverse speed gear R1 and the second input gear G2. In addition, the second reverse speed gear R2 is engaged with the fifth input gear G5.

Referring to FIG. 6C, the first reverse speed gear R1 is fixed to the first reverse shaft RS1, the second reverse speed gear R2 is rotatable about the first reverse shaft RS1, and the fifth synchronizer SL5 is disposed on the first reverse shaft RS1 and operably connects the second reverse speed gear R2 with the first reverse shaft RS1.

In addition, the third reverse speed gear R3 fixed to the second reverse shaft RS2 is engaged with the first reverse speed gear R1 and the second input gear G2, and the second reverse speed gear R2 is engaged with the fifth input gear G5.

Figure 7:
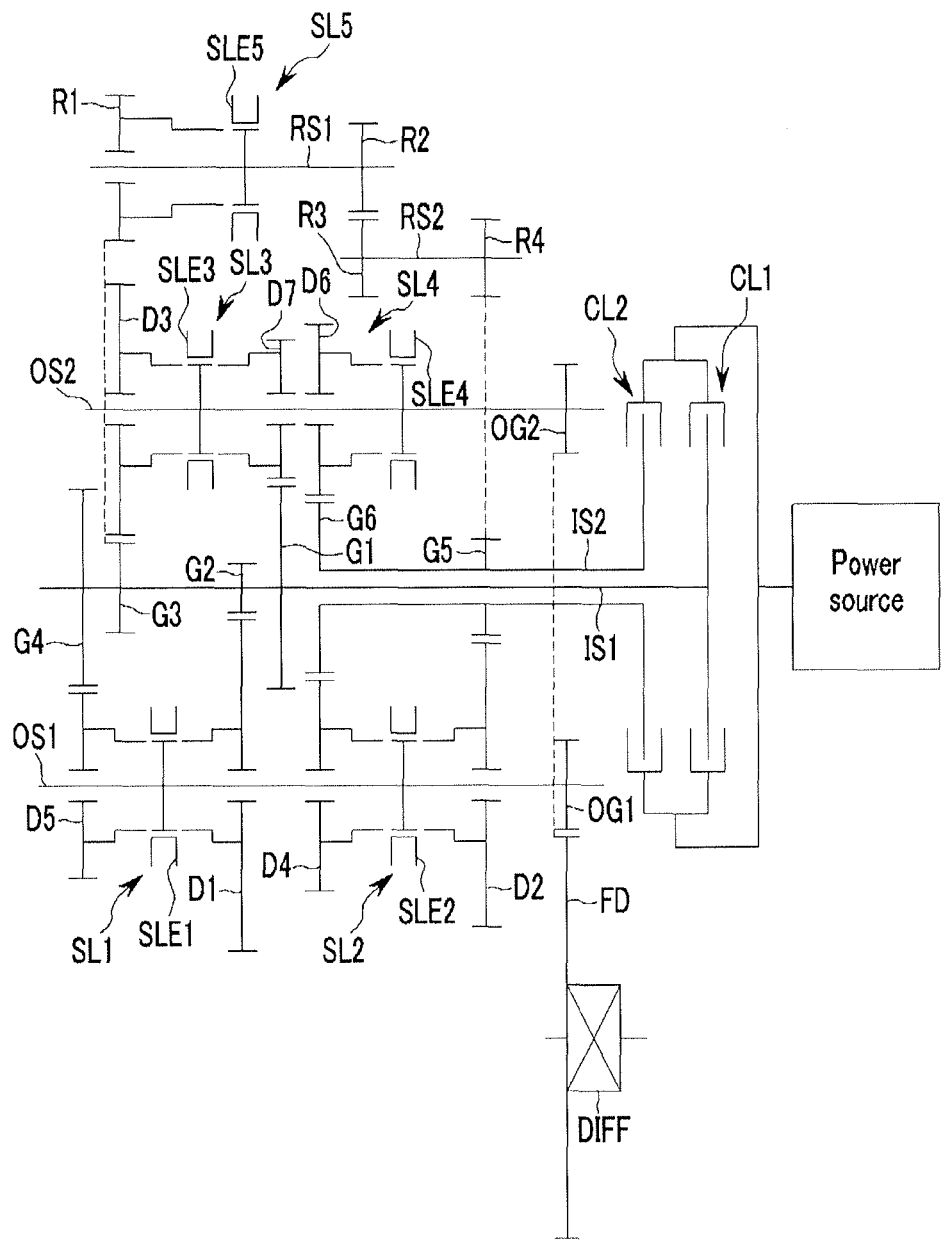
FIG. 7 is a schematic diagram of a power transmitting apparatus for a vehicle according to the various exemplary embodiments of the present invention.

FIG. 7 is a schematic diagram of a power transmitting apparatus for a vehicle according to the second exemplary embodiment of the present invention.

Referring to FIG. 7, the reverse speed device is changed in the power transmitting apparatus according to the second exemplary embodiment of the present invention, compared with the first exemplary embodiment. Therefore, detailed description of the variable connecting device, the input device, and the speed output device will be omitted.

The reverse speed device according to the second exemplary embodiment includes the first and second reverse shafts RS1 and RS2 disposed in parallel with the first and second input shafts IS1 and IS2.

The first and second reverse speed gears R1 and R2 are disposed on the first reverse shaft RS1. The first reverse speed gear R1 is rotatable about the first reverse shaft RS1 and the second reverse speed gear R2 is fixed to the first reverse shaft RS1.

In addition, the fifth synchronizer SL5 operably connecting the first reverse speed gear R1 with the first reverse shaft RS1 is disposed on the first reverse shaft RS1.

In addition, third and fourth reverse speed gears R3 and R4 are disposed on the second reverse shaft RS2. Both of the third reverse speed gear R3 and the fourth reverse speed gear R4 are fixed to the second reverse shaft RS2.

At this time, the second reverse speed gear R2 and the third reverse speed gear R3 are engaged with each other.

In addition, the first reverse speed gear R1 is engaged with the third input gear G3 on the first input shaft IS1, and the fourth reverse speed gear R4 is engaged with the fifth input gear G5 on the second input shaft IS2 engaged with the second speed gear D2 on the first output shaft OS1.

Figure 8:
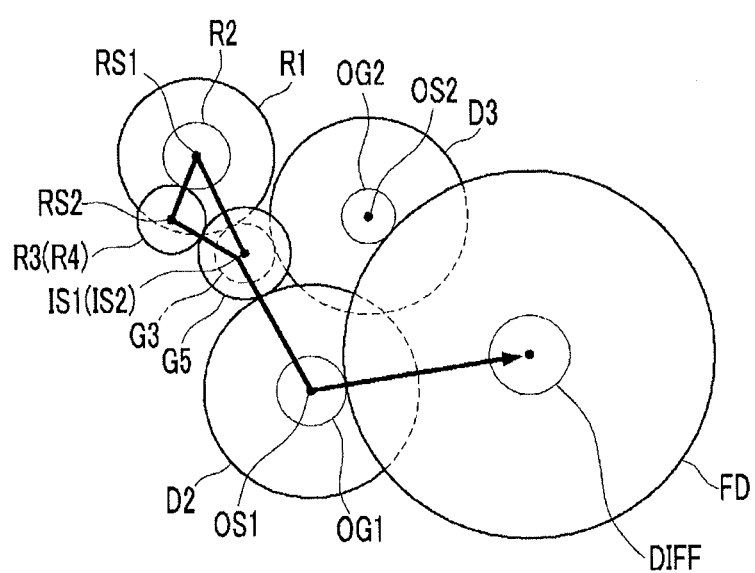
FIG. 8 is an axial plan view of a power transmitting apparatus for a vehicle according to the various exemplary embodiments of the present invention.

FIG. 8 is an axial plan view of a power transmitting apparatus for a vehicle according to the second exemplary embodiment of the present invention.

Referring to FIG. 8, the first input shaft IS1 as well as the second input shaft IS2, the first and second output shafts OS1 and OS2, the first and second reverse shafts RS1 and RS2, and the differential device DIFF are disposed in parallel with each other.

The third input gear G3 on the first input shaft IS1 is engaged with the third speed gear D3 on the second output shaft OS2 and the first reverse speed gear R1 on the first reverse shaft RS1, and the second reverse speed gear R2 on the first reverse shaft RS1 is engaged with the third reverse speed gear R3 on the second reverse shaft RS2.

In addition, the fourth reverse speed gear R4 on the second reverse shaft RS2 is engaged with the fifth input gear G5 on the second input shaft IS2, and the fifth input gear G5 on the second input shaft IS2 is engaged with the second speed gear D2 on the first output shaft OS1.

In addition, the first and second output gears OG1 and OG2 on the first and second output shafts OS1 and OS2 are engaged with the final reduction gear FD of the differential device DIFF.

FIG. 9 is an operational chart of a power transmitting apparatus for a vehicle according to the second exemplary embodiment of the present invention.

[First Forward Speed]

At the first forward speed 1st, the first speed gear D1 and the first output shaft OS1 are operably connected through the sleeve SEL1 of the first synchronizer SL1. After that, the first clutch CL1 is operated. Then, shift to the first forward speed is completed.

[Second Forward Speed]

If vehicle speed increases at the first forward speed 1st and shift to the second forward speed 2nd is necessary, the second speed gear D2 and the first output shaft OS1 are operably connected through the sleeve SEL2 of the second synchronizer SL2. After that, the first clutch CL1 is released and the second clutch CL2 is operated. Then, the shift to the second forward speed is completed.

After the shift to the second forward speed is completed, the sleeve SEL1 of the first synchronizer SL1 is moved to a neutral position.

[Third Forward Speed]

If the vehicle speed increases at the second forward speed 2nd and shift to the third forward speed 3rd is necessary, the third speed gear D3 and the second output shaft OS2 are operably connected through the sleeve SEL3 of the third synchronizer SL3. After that, the second clutch CL2 is released and the first clutch CL1 is operated. Then, the shift to the third forward speed is completed.

After the shift to the third forward speed is completed, the sleeve SEL2 of the second synchronizer SL2 is moved to a neutral position.

[Fourth Forward Speed]

If the vehicle speed increases at the third forward speed 3rd and shift to the fourth forward speed 4th is necessary, the fourth speed gear D4 and the first output shaft OS1 are operably connected through the sleeve SEL2 of the second synchronizer SL2. After that, the first clutch CL1 is released and the second clutch CL2 is operated. Then, the shift to the fourth forward speed is completed.

After the shift to the fourth forward speed is completed, the sleeve SEL3 of the third synchronizer SL3 is moved to a neutral position.

[Fifth Forward Speed]

If the vehicle speed increases at the fourth forward speed 4th and shift to the fifth forward speed 5th is necessary, the fifth speed gear D5 and the first output shaft OS1 are operably connected through the sleeve SEL1 of the first synchronizer SL1. After that, the second clutch CL2 is released and the first clutch CL1 is operated. Then, the shift to the fifth forward speed is completed.

After the shift to the fifth forward speed is completed, the sleeve SEL2 of the second synchronizer SL2 is moved to a neutral position.

[Sixth Forward Speed]

If the vehicle speed increases at the fifth forward speed 5th and shift to the sixth forward speed 6th is necessary, the sixth speed gear D6 and the second output shaft OS2 are operably connected through the sleeve SEL4 of the fourth synchronizer SL4. After that, the first clutch CL1 is released and the second clutch CL2 is operated. Then, the shift to the sixth forward speed is completed.

After the shift to the sixth forward speed is completed, the sleeve SEL1 of the first synchronizer SL1 is moved to a neutral position.

[Seventh Forward Speed]

If the vehicle speed increases at the sixth forward speed 6th and shift to the seventh forward speed 7th is necessary, the seventh speed gear D7 and the second output shaft OS2 are operably connected through the sleeve SEL3 of the third synchronizer SL3. After that, the second clutch CL2 is released and the first clutch CL1 is operated. Then, the shift to the seventh forward speed is completed.

After the shift to the seventh forward speed is completed, the sleeve SEL4 of the fourth synchronizer SL4 is moved to a neutral position.

Figure 10:
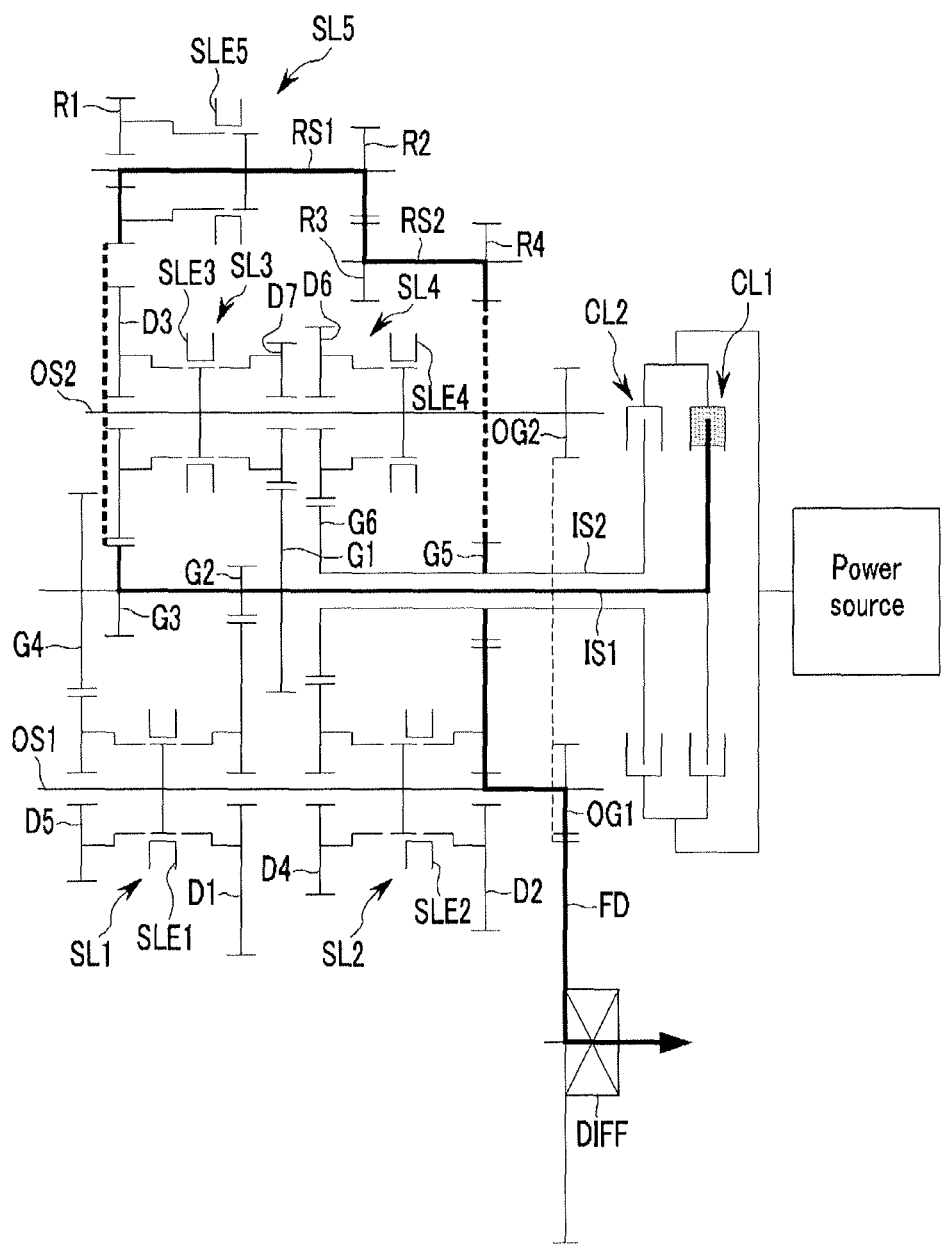
FIG. 10 is a drawing for illustrating flow of power at a first reverse speed in a power transmitting apparatus for a vehicle according to the various exemplary embodiments of the present invention.
Figure 11:
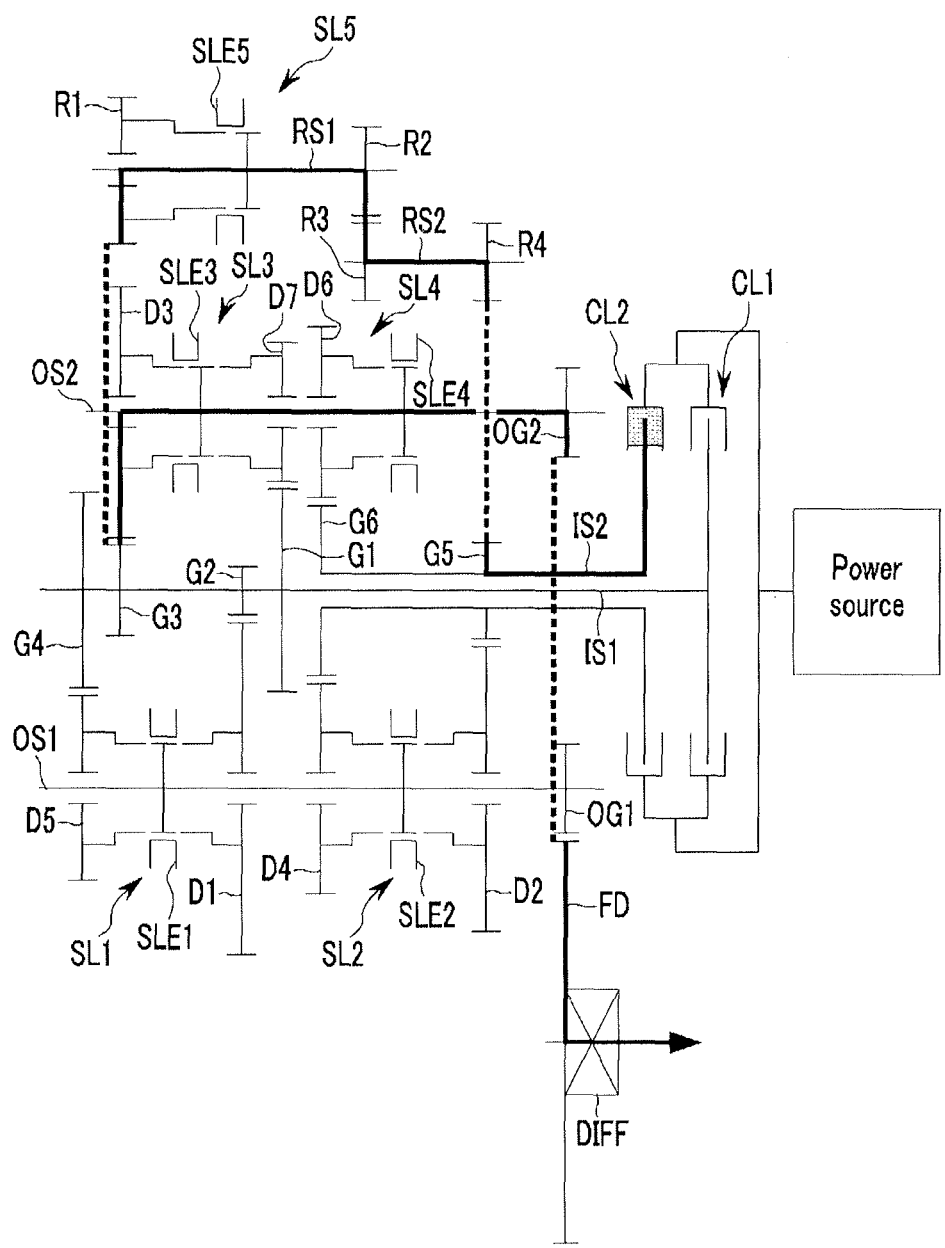
FIG. 11 is a drawing for illustrating flow of power at a second reverse speed in a power transmitting apparatus for a vehicle according to the various exemplary embodiments of the present invention.

FIG. 10 is a drawing for illustrating flow of power at a first reverse speed in a power transmitting apparatus for a vehicle according to the second exemplary embodiment of the present invention, and FIG. 11 is a drawing for illustrating flow of power at a second reverse speed in a power transmitting apparatus for a vehicle according to the second exemplary embodiment of the present invention.

Referring to FIG. 9 and FIG. 10, the second speed gear D2 and the first output shaft OS1 are operably connected through the sleeve SEL2 of the second synchronizer SL2, and the first reverse speed gear R1 and the first reverse shaft RS1 are operably connected through the sleeve SEL5 of the fifth synchronizer SL5 at the first reverse speed Rev1. After that, if the first clutch CL1 is operated, a shift to the first reverse speed is completed.

Therefore, the torque of the power source is transmitted to the final reduction gear FD through the first input shaft IS1, the third input gear G3, the first reverse speed gear R1, the first reverse shaft RS1, the second reverse speed gear R2, the third reverse speed gear R3, the second reverse shaft RS2, the fourth reverse speed gear R4, the fifth input gear G5, the second speed gear D2, the first output shaft OS1, and the first output gear OG1. Therefore, the driving wheel is rotated inversely.

Referring to FIG. 9 and FIG. 11, the third speed gear D3 and the second output shaft OS2 are operably connected through the sleeve SEL3 of the third synchronizer SL3, and the first reverse speed gear R1 and the first reverse shaft RS1 are operably connected through the sleeve SEL5 of the fifth synchronizer SL5 at the second reverse speed Rev2. After that, if the second clutch CL2 is operated, a shift to the second reverse speed is completed.

Therefore, the torque of the power source is transmitted to the final reduction gear FD through the second input shaft IS1, the fifth input gear G5, the fourth reverse speed gear R4, the second reverse shaft RS2, the third reverse speed gear R3, the second reverse speed gear R2, the first reverse shaft RS1, the first reverse speed gear R1, the third input gear G3, the third speed gear D3, the second output shaft OS2, and the second output gear OG2. Therefore, the driving wheel is rotated inversely.

The power transmitting apparatus for the vehicle according to the second exemplary embodiment of the present invention can achieve two reverse speeds by control of the first and second clutches CL1 and CL2 and the synchronizers.

Two synchronizers SL1 and SL2, the first speed gear D1, the fifth speed gear D5, the second speed gear D2, the fourth speed gear D4 and the first output gear OG1 are disposed on the first output shaft OS1, two synchronizers SL3 and SL4, the third speed gear D3, the seventh speed gear D7, the sixth speed gear D6 and the second output gear OG2 are disposed on the second output shaft OS2, and one synchronizer SL5 and the first, second, third and fourth reverse speed gears R1, R2, R3, and R4 involved in the reverse speeds are disposed on the first and second reverse shafts RS1 and RS2 in the power transmitting apparatus according to the second exemplary embodiment of the present invention.

Since the fourth synchronizer SL4 operably connects one speed gear to the second output shaft OS2, the number of components may be reduced and a length may be shortened.

Weight and cost may be reduced due to reduction of the number of components, and mountability may be improved by shortening length of the transmission.

Figure 12:
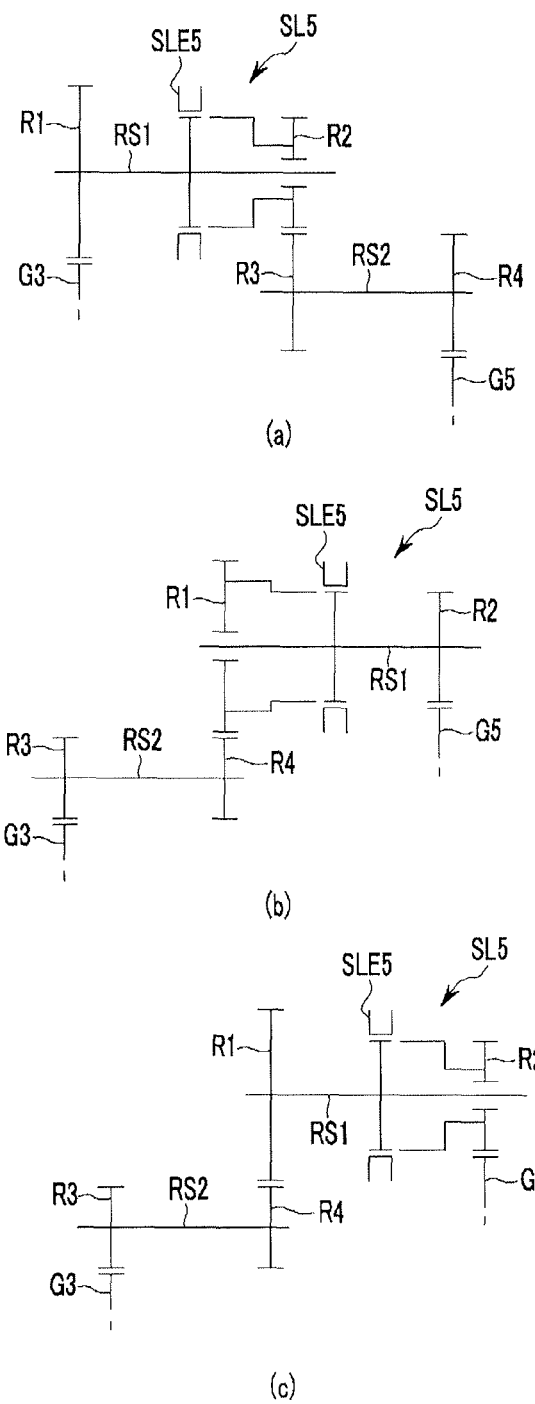
FIG. 12 is a drawing of another example of a reverse speed device in a power transmitting apparatus for a vehicle according to the various exemplary embodiments of the present invention.

FIG. 12 is a drawing of another example of a reverse speed device in a power transmitting apparatus for a vehicle according to the second exemplary embodiment of the present invention.

Referring to FIG. 12, the reverse speed device having various layouts can be achieved by disposing the fifth synchronizer SL5 and the third and fourth reverse speed gears R3 and R4 in different ways in the power transmitting apparatus for the vehicle according to the second exemplary embodiment of the present invention.

That is, since structure and function of the variable connecting device, the input device and the speed output device are not changed although the layout of the reverse speed device is changed, only the reverse speed device will be described in detail.

Referring to FIG. 12A, the first reverse speed gear R1 is fixed to the first reverse shaft RS1, the second reverse speed gear R2 is rotatable about the first reverse shaft RS1, and the fifth synchronizer SL5 is disposed on the first reverse shaft RS1 and operably connects the second reverse speed gear R2 with the first reverse shaft RS1.

Referring to FIG. 12B, the fourth reverse speed gear R4 fixed to the second reverse shaft RS2 is engaged with the first reverse speed gear R1, the third reverse speed gear R3 fixed to the second reverse shaft RS2 is engaged with the third input gear G3, and the second reverse speed gear R2 is engaged with the fifth input gear G5.

Referring to FIG. 12C, the first reverse speed gear R1 is fixed to the first reverse shaft RS1, the second reverse speed gear R2 is rotatable about the first reverse shaft RS1, and the fifth synchronizer SL5 is disposed on the first reverse shaft RS1 and operably connects the second reverse speed gear R2 with the first reverse shaft RS1.

In addition, the fourth reverse speed gear R4 fixed to the second reverse shaft RS2 is engaged with the first reverse speed gear R1, the third reverse speed gear R3 fixed to the second reverse shaft RS2 is engaged with the third input gear G3, and the second reverse speed gear R2 is engaged with the fifth input gear G5.

Figure 13:
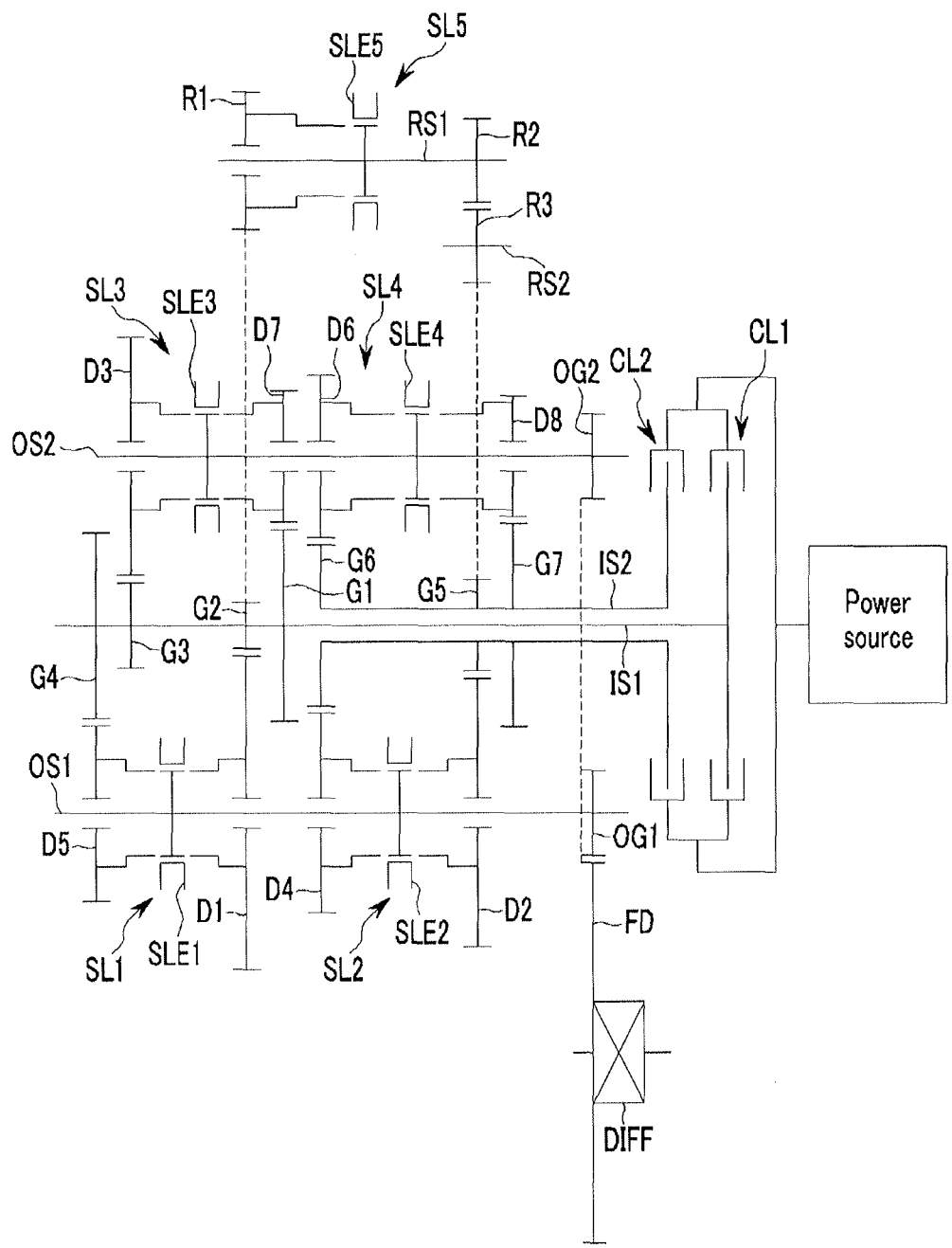
FIG. 13 is a schematic diagram of a power transmitting apparatus for a vehicle according to the various exemplary embodiments of the present invention.

FIG. 13 is a schematic diagram of a power transmitting apparatus for a vehicle according to the third exemplary embodiment of the present invention.

Referring to FIG. 13, the power transmitting apparatus for the vehicle according to the third exemplary embodiment of the present invention can achieve eight forward speeds. The fourth synchronizer SL4 is configured to operably connect only the sixth speed gear D6 with the second output shaft OS2 in the first exemplary embodiment. However, an eighth speed gear D8 is disposed on the second output shaft OS2 and a seventh input gear G7 engaged with the eighth speed gear D8 is disposed on the second input shaft IS2 in the third exemplary embodiment. In addition, the fourth synchronizer SL4 operably connects the sixth speed gear D6 or the eighth speed gear D8 to the second output shaft OS2.

Therefore, a length of the power transmitting apparatus may be greatly reduced, compared with a conventional power transmitting apparatus achieving eight forward speeds.

One synchronizer and a plurality of gears involved in the reverse speeds are disposed on the reverse shafts, and any one synchronizer on the first output shaft or the second output shaft operably connects only one speed gear to the first output shaft or the second output shaft according to the exemplary embodiments of the present invention. Therefore, the number of components may be reduced and a length of the power transmitting apparatus may be minimized.

Weight and cost may be reduced due to reduction of the number of components, and mountability may be improved by shortening length of the power transmitting apparatus.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmitting apparatus for a vehicle which selectively transmits torque of power source to two input shafts through two clutches and outputs changed torque through two output shafts after the torque selectively transmitted to the two input shafts is changed,
wherein the two input shafts respectively have a plurality of input gears fixed thereon, the two output shafts respectively have a plurality of speed gears rotatable on the output shafts and a plurality of synchronizers operably connecting each speed gear to any one of the output shafts, and each input gear is engaged with at least one speed gear,
wherein one input gear on one input shaft of the two input shafts is engaged with one of first and second reverse speed gears on a first reverse shaft disposed in parallel with the corresponding input shaft, the other of the first and second reverse speed gears on the first reverse shaft is engaged with a third reverse speed gear fixed on a second reverse shaft disposed in parallel with the first reverse shaft, and the third reverse speed gear is engaged with one input gear on the other input shaft of the two input shafts, and
wherein one of the first and second reverse speed gears is rotatable about the first reverse shaft and is operably connected to the first reverse shaft through a synchronizer disposed on the first reverse shaft, and the other of the first and second reverse speed gears is fixed on the first reverse shaft.

2. The power transmitting apparatus of claim 1, wherein the two input shafts include a first input shaft selectively receiving the torque of the power source through a first clutch, and a second input shaft being a hollow shaft in which the first input shaft is inserted without rotational interference with the second input shaft and receiving the torque of the power source through a second clutch, and
wherein the two output shafts include first and second output shafts disposed in parallel with the first and second input shafts.

3. The power transmitting apparatus of claim 2, wherein the first input shaft is provided with first, second, third, and fourth input gears and the second input shaft is provided with fifth and sixth input gears,
wherein the first output shaft is provided with a first speed gear engaged with the second input gear, a fifth speed gear engaged with the fourth input gear, a second speed gear engaged with the fifth input gear, and a fourth speed gear engaged with the sixth input gear,
wherein the second output shaft is provided with a third speed gear engaged with the third input gear, a seventh speed gear engaged with the first input gear, and a sixth speed gear engaged with the sixth input gear, and
wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

4. The power transmitting apparatus of claim 3, wherein the first reverse speed gear is engaged with the second input gear on the first input shaft, the second reverse speed gear is engaged with the third reverse speed gear, and the third reverse speed gear is engaged with the fifth input gear on the second input shaft.

5. The power transmitting apparatus of claim 4, wherein the first reverse speed gear is rotatable about the first reverse shaft and the second reverse speed gear is fixed on the first reverse shaft.

6. The power transmitting apparatus of claim 4, wherein the first reverse speed gear is fixed on the first reverse shaft and the second reverse speed gear is rotatable about the first reverse shaft.

7. The power transmitting apparatus of claim 3, wherein the first reverse speed gear is engaged with the third reverse speed gear, the second reverse speed gear is engaged with the fifth input gear on the second input shaft, and the third reverse speed gear is engaged with the second input gear on the first input shaft.

8. The power transmitting apparatus of claim 7, wherein the first reverse speed gear is rotatable about the first reverse shaft and the second reverse speed gear is fixed on the first reverse shaft.

9. The power transmitting apparatus of claim 7, wherein the first reverse speed gear is fixed on the first reverse shaft and the second reverse speed gear is rotatable about the first reverse shaft.

10. The power transmitting apparatus of claim 2, wherein the first input shaft is provided with first, second, third, and fourth input gears and the second input shaft is provided with fifth, sixth, and seventh input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, a sixth speed gear engaged with the sixth input gear, and an eighth speed gear engaged with the seventh input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear or the eighth speed gear to the second output shaft.

11. A power transmitting apparatus for a vehicle which selectively transmits torque of power source to two input shafts through two clutches and outputs changed torque through two output shafts after the torque selectively transmitted to the two input shafts is changed, wherein the two input shafts respectively have a plurality of input gears fixed thereon, the two output shafts respectively have a plurality of speed gears rotatable on the output shafts and a plurality of synchronizers operably connecting each speed gear to any one of the output shafts, and each input gear is engaged with at least one speed gear, wherein one input gear on one input shaft of the two input shafts is engaged with one of first and second reverse speed gears on a first reverse shaft disposed in parallel with the corresponding input shaft, the other of the first and second reverse speed gears on the first reverse shaft is engaged with one of third and fourth reverse speed gears mounted on a second reverse shaft, and the other of the third and fourth reverse speed gears is engaged with one input gear on the other input shaft, and wherein one of the first and second reverse speed gears is rotatable about the first reverse shaft and is operably connected to the first reverse shaft through a synchronizer disposed on the first reverse shaft, and the other of the first and second reverse speed gears is fixed on the first reverse shaft.

12. The power transmitting apparatus of claim 11, wherein the two input shafts include a first input shaft selectively receiving the torque of the power source through a first clutch, and a second input shaft being a hollow shaft in which the first input shaft is inserted without rotational interference with the second input shaft and receiving the torque of the power source through a second clutch, and wherein the two output shafts include first and second output shafts disposed in parallel with the first and second input shafts.

13. The power transmitting apparatus of claim 12, wherein the first input shaft is provided with first, second, third, and fourth input gears and the second input shaft is provided with fifth and sixth input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, and a sixth speed gear engaged with the sixth input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

14. The power transmitting apparatus of claim 13, wherein the first reverse speed gear is engaged with the third input gear on the first input shaft, the second reverse speed gear is engaged with the third reverse speed gear, the fourth reverse speed gear is engaged with the fifth input gear on the second input shaft.

15. The power transmitting apparatus of claim 14, wherein the first reverse speed gear is rotatable about the first reverse shaft and the second reverse speed gear is fixed on the first reverse shaft.

16. The power transmitting apparatus of claim 14, wherein the first reverse speed gear is fixed on the first reverse shaft and the second reverse speed gear is rotatable about the first reverse shaft.

17. The power transmitting apparatus of claim 13, wherein the first reverse speed gear is engaged with the fourth reverse speed gear, the second reverse speed gear is engaged with the fifth input gear on the second input shaft, and the third reverse speed gear is engaged with the third input gear on the first input shaft.

18. The power transmitting apparatus of claim 17, wherein the first reverse speed gear is rotatable about the first reverse shaft and the second reverse speed gear is fixed on the first reverse shaft.

19. The power transmitting apparatus of claim 17, wherein the first reverse speed gear is fixed on the first reverse shaft and the second reverse speed gear is rotatable about the first reverse shaft.

20. The power transmitting apparatus of claim 12, wherein the first input shaft is provided with first, second, third, and fourth input gears and the second input shaft is provided with fifth, sixth, and seventh input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, a sixth speed gear engaged with the sixth input gear, and an eighth speed gear engaged with the seventh input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear or the eighth speed gear to the second output shaft.

\* \* \* \* \*